United States Patent
Kitazawa et al.

(10) Patent No.: US 7,211,309 B2
(45) Date of Patent: May 1, 2007

(54) ANTISTATIC LAMINATED POLYESTER FILM

(75) Inventors: Satoshi Kitazawa, Anpachi-gun (JP); Koji Kubo, Anpachi-gun (JP); Takeshi Asada, Anpachi-gun (JP); Shigeyuki Watamabe, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 10/541,234

(22) PCT Filed: Mar. 24, 2004

(86) PCT No.: PCT/JP2004/003999

§ 371 (c)(1),
(2), (4) Date: Jul. 1, 2005

(87) PCT Pub. No.: WO2004/085524

PCT Pub. Date: Oct. 7, 2004

(65) Prior Publication Data

US 2006/0035070 A1 Feb. 16, 2006

(30) Foreign Application Priority Data

Mar. 25, 2003 (JP) .............................. 2003-082543

(51) Int. Cl.
B32B 27/08 (2006.01)
B32B 27/18 (2006.01)
B32B 27/20 (2006.01)
B32B 27/30 (2006.01)
B32B 27/36 (2006.01)

(52) U.S. Cl. .................. 428/41.7; 428/40.1; 428/141; 428/195; 428/323; 428/337; 428/339; 428/343; 428/480; 428/483; 428/522; 428/910; 525/165; 525/166; 525/175; 525/191; 525/203; 525/206; 525/221; 525/222; 525/231; 525/238

(58) Field of Classification Search .................... None
See application file for complete search history.

(56) References Cited

U.S. PATENT DOCUMENTS

| | | | |
|---|---|---|---|
| 4,214,035 A * | 7/1980 | Heberger .................... 428/340 |
| 5,006,589 A * | 4/1991 | Sakamoto et al. ........... 524/430 |
| 5,082,730 A * | 1/1992 | Takeda et al. ............... 428/336 |
| 5,202,193 A * | 4/1993 | Sumi et al. ............... 428/479.6 |
| 5,206,084 A * | 4/1993 | Takeda et al. ............... 428/336 |
| 5,252,388 A * | 10/1993 | Murooka et al. ........... 428/328 |
| 5,281,472 A | 1/1994 | Takahashi et al. |
| 5,306,606 A | 4/1994 | Tachibana et al. |
| 5,368,932 A * | 11/1994 | Murooka et al. ........... 428/327 |
| 5,374,467 A * | 12/1994 | Sato ............................ 428/143 |
| 5,453,326 A | 9/1995 | Siddiqui |
| 5,516,574 A * | 5/1996 | Ogawa et al. ............... 428/143 |
| 5,541,242 A * | 7/1996 | Nakayama et al. .......... 524/101 |
| 5,604,083 A * | 2/1997 | Valsecchi et al. .......... 430/528 |
| 5,654,369 A * | 8/1997 | Tsubaki et al. ............. 525/205 |
| 5,729,266 A * | 3/1998 | Malhotra ..................... 347/102 |
| 5,846,637 A * | 12/1998 | Malhotra et al. ........ 428/195.1 |
| 6,103,368 A * | 8/2000 | Fukuda et al. .............. 428/337 |
| 6,221,461 B1 * | 4/2001 | Kobayashi et al. .......... 428/143 |
| 6,238,782 B1 * | 5/2001 | Hellmann et al. ........... 428/216 |
| 6,469,092 B1 | 10/2002 | Stoppelmann et al. |
| 6,582,789 B1 * | 6/2003 | Sumi ........................ 428/40.1 |
| 6,926,945 B2 * | 8/2005 | Yano et al. ................. 428/141 |
| 2002/0064650 A1 * | 5/2002 | Masuda ...................... 428/336 |
| 2002/0197496 A1 * | 12/2002 | Mizutani et al. ............ 428/480 |
| 2004/0028919 A1 * | 2/2004 | Yamamoto et al. ......... 428/458 |

FOREIGN PATENT DOCUMENTS

| | | |
|---|---|---|
| EP | 0 366 483 A2 | 5/1990 |
| EP | 0 435 080 A1 | 7/1991 |
| EP | 0 445 744 A2 | 9/1991 |
| EP | 0 570 795 A1 | 11/1993 |
| EP | 0 637 603 A1 | 2/1995 |
| JP | 03-255139 | 11/1991 |
| JP | 04-028728 | 1/1992 |
| JP | 05-320390 | 12/1993 |
| JP | 08-309940 | * 11/1996 |
| JP | 8-309940 A | 11/1996 |
| JP | 2003-292654 | 10/2003 |
| JP | 2003-292654 A | 10/2003 |
| WO | WO 94/13477 A1 | 6/1994 |

* cited by examiner

*Primary Examiner*—Vivian Chen
(74) *Attorney, Agent, or Firm*—Sughrue Mion, PLLC

(57) ABSTRACT

An antistatic film having an antistatic coating film on at least one surface of a polyester film, the antistatic coating film comprising a polymer having a polymerized unit represented by the following formula (1):

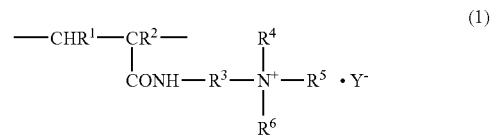

wherein $R^1$ and $R^2$ each independently represent a hydrogen atom or a methyl group, $R^3$ represents an alkylene group having 2 to 10 carbon atoms, $R^4$ and $R^5$ each independently represent an alkyl group having 1 to 5 carbon atoms, $R^6$ represents a hydrogen atom, an alkyl group having 1 to 5 carbon atoms or a hydroxyalkyl group having 2 to 10 carbon atoms, and $Y^-$ represents a halogen ion, a halogenated alkyl ion, a nitrate ion, a sulfate ion, an alkyl sulfate ion, a sulfonate ion or an alkyl sulfonate ion. The film is used in such applications requiring an antistatic property such as a protective film for a liquid crystal polarizing plate.

23 Claims, No Drawings

ANTISTATIC LAMINATED POLYESTER FILM

TECHNICAL FIELD

The present invention relates to an antistatic film and various functional films using the same as a base film. More specifically, it relates to an antistatic film which is excellent in such properties as an antistatic property, back transferability, abrasion resistance, an anti-blocking property, recoverability and printability and is useful for a film for protecting a polarizing plate for a liquid crystal, a reproduction film, an electronic material, an OHP film, a packing film, a label, a magnetic card (e.g., a telephone card or a prepaid card) and the like, and various functional films using the same as a base film, such as those described above.

BACKGROUND ART

Films comprising polyesters such as a polyethylene terephthalate and a polyethylene-2,6-naphthalate have been widely used for general industrial materials such as a reproduction film, an electronic material, an OHP film, a packing film, a label and a magnetic card and magnetic recording materials such as a magnetic tape. As polyester films, films comprising a polyethylene terephthalate or polyethylene naphthalate having excellent water resistance, chemical resistance, mechanical strength, dimensional stability and electric properties have been used or studied. However, the polyester films have a problem of being liable to be electrically charged. When the film is electrically charged, dust is stuck on the surfaces thereof, resulting in degradation in quality. Further, when an organic solvent is used in a film processing step, there is a risk that electric discharge from the electrically charged film may cause fire.

As a measure for solving such problems caused by electrical charge, a method comprising kneading an anionic compound such as an organic sulfonate group, metal powder, carbon powder or the like into the polyester film and a method comprising depositing a metal compound on the surfaces of the polyester film are proposed and practically used. However, such methods have problems that the transparency of the film is degraded and that processing costs are high.

Further, as other methods, various methods for forming an antistatic coating film on the surface of the film are proposed and practically used. Although low-molecular-weight antistatic agents and polymer antistatic agents are known as an antistatic agent to be contained in the antistatic coating film, they both have advantages and disadvantages. Thus, an appropriate antistatic agent is selected and used according to application purposes.

JP-A 4-28728 (the term "JP-A" as used herein means an "unexamined Japanese patent application") discloses, as a low-molecular-weight antistatic agent, a surfactant-type anionic antistatic agent such as a long chain alkyl compound having a sulfonate group. Further, JP-A 3-255139 and JP-A 5-320390 disclose, as polymer antistatic agents, a polymer having an ionized nitrogen element in the principal chain and a sulfonate-group-modified polystyrene.

However, an antistatic coating film using a low-molecular-weight antistatic agent has a problem that a portion of the antistatic agent moves in the coating film, concentrates near the interface and moves to the opposite surface of the film, or antistatic property deteriorates as time passage. Meanwhile, an antistatic coating film using a polymer antistatic agent is not economical because it must contain the antistatic agent in a large amount or have a large thickness so as to attain a good antistatic property. Further, when film chippings unable to be used in products, e.g., film edges cut off and removed in a production process are collected and used as recycled materials for film production, coating film components contained in the recycled materials are thermally degraded during melt film production, and a significantly colored film which lacks in practicality and therefore has poor recoverability is obtained. In addition, there occur such a problem that the films have blocking therebetween and are difficult to separate from each other or the coating films are liable to be abraded, and solutions for the problems are desired.

DISCLOSURE OF THE INVENTION

An object of the present invention is to provide an antistatic film which can solve the problems of the prior art, i.e., an antistatic film on which an antistatic coating film can be formed at low processing costs without a pretreatment such as a corona discharge treatment and which has an excellent antistatic property, back transferability, abrasion resistance, anti-blocking property and recoverability.

Another object of the present invention is to provide a film to be laminated on a liquid crystal polarizing plate, a film for a label or a film for a magnetic card, the films using the antistatic film of the present invention which has excellent properties including an antistatic property as described above as a base film and taking advantages of the properties.

Other objects and advantages of the present invention will become apparent from the following description.

According to the present invention, firstly, the above objects and advantages of the present invention are achieved by an antistatic film comprising a polyester film and an antistatic coating film formed on at least one surface of the polyester film, the antistatic coating film comprising a polymer having a polymerized unit represented by the following formula (1):

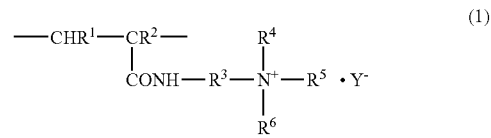

wherein $R^1$ and $R^2$ each independently represent a hydrogen atom or a methyl group, $R^3$ represents an alkylene group having 2 to 10 carbon atoms, $R^4$ and $R^5$ each independently represent an alkyl group having 1 to 5 carbon atoms, $R^6$ represents a hydrogen atom, an alkyl group having 1 to 5 carbon atoms or a hydroxyalkyl group having 2 to 10 carbon atoms, and $Y^-$ represents a halogen ion, a halogenated alkyl ion, a nitrate ion, a sulfate ion, an alkyl sulfate ion, a sulfonate ion or an alkyl sulfonate ion.

According to the present invention, secondly, the above objects and advantages of the present invention are achieved by a film to be laminated on a liquid crystal polarizing plate, the film comprising the above antistatic film of the present invention, an adhesive layer on one surface of the antistatic film, and a temporarily existing layer on the surface of the adhesive layer.

According to the present invention, thirdly, the above objects and advantages of the present invention are achieved by a film for a label, the film comprising the above antistatic film of the present invention and an ultraviolet curing ink layer or a thermosetting ink layer on the surface of the antistatic coating film of the antistatic film.

According to the present invention, fourthly, the above objects and advantages of the present invention are achieved by a film for a magnetic card, the film comprising the above antistatic film of the present invention, a magnetic layer on the surface of the antistatic coating film of the antistatic film, and an ultraviolet curing ink layer on the other surface of the antistatic film.

THE PREFERRED EMBODIMENT OF THE INVENTION

Detailed Description of the present invention will be described hereinafter.

Polyester

The polyester of the polyester film in the present invention is a linear saturated polyester comprising a dicarboxylic acid component and a glycol component.

Illustrative examples of the dicarboxylic acid component include terephthalic acid, isophthalic acid, 2,6-naphthalene dicarboxylic acid, hexahydroterephthalic acid, 4,4'-diphenyl dicarboxylic acid, adipic acid, sebacic acid, and dodecane dicarboxylic acid. Terephthalic acid and 2,6-naphthalene dicarboxylic acid are particularly preferred from the viewpoint of the mechanical properties of the film.

Illustrative examples of the glycol component include ethylene glycol, diethylene glycol, propylene glycol, 1,3-propanediol, 1,4-butanediol, neopentyl glycol, 1,6-hexanediol, cyclohexane dimethanol, and a polyethylene glycol. Ethylene glycol is particularly preferred from the viewpoint of the stiffness of the film.

Of these polyesters, a polyethylene terephthalate and a polyethylene-2,6-naphthalate are preferred because they give a film having excellent mechanical properties such as a high Young's modulus and excellent thermal properties such as thermal dimensional stability.

The above polyester may be a copolyester copolymerized with the above dicarboxylic acid component or glycol component as a third component. The polyester may be a polyester copolymerized with a polycarboxylic acid component or polyol component having at least three functional groups in such a small amount that the polyester is substantially linear, e.g. 5 mol % or smaller.

The polyester may be produced in the usual manner. The polyester preferably has an intrinsic viscosity of 0.45 dl/g or higher because the film has good mechanical properties such as high rigidity.

The polyester film in the present invention may comprise two types of particles, i.e., first particles and second particles. The first particles and the second particles comprise preferably of different chemical species. In that case, for example, both particles may comprise an organic material or inorganic material and, in another example, one of them comprises an organic material and the other comprises an inorganic material.

Illustrative examples of the first particles and the second particles include inorganic particles such as silica, alumina, calcium carbonate, calcium phosphate, talc, zeolite and kaolin, and organic particles comprising heat-resistant polymers such as a cross-linked polystyrene, a cross-linked acrylic resin and a cross-linked silicone. Of the particles, synthetic silica particles, cross-linked silicone particles and alumina particles are particularly preferred so as to attain high transparency and high slipperiness. The average particle diameter of the first particles is preferably 0.8 to 2.5 μm, more preferably 1.0 to 2.0 μm, and the average particle diameter of the second particles is preferably 0.05 to 0.4 μm, more preferably 0.08 to 0.35 μm. By these two types of particles having different average particle diameters, the slipperiness and transparency of the film can be balanced. For instance, even if only the first particles are added, the surface of the film lacks enough small projections to roughen the surface, resulting in fine scratches. Meanwhile, when only the second particles are added, the particle diameters are so small that the slipperiness of the film is not improved.

The polyester film in the present invention contains first particles having an average particle diameter of 0.8 to 2.5 μm in an amount of preferably 0.001 to 0.1 wt %, more preferably 0.005 to 0.1 wt %, particularly preferably 0.008 to 0.07 wt %, from the viewpoint of balance between the slipperiness and transparency of the film. Further, the polyester film contains second particles having an average particle diameter of 0.05 to 0.4 μm in an amount of preferably 0.1 to 0.8 wt %, more preferably 0.1 to 0.6 wt %, particularly preferably 0.1 to 0.4 wt %.

The particle size distribution of the particles used in the present invention is sharp; for example, the standard deviation of the average particle diameter is preferably 0.001 to 0.5, more preferably 0.001 to 0.3, particularly preferably 0.001 to 0.2. That is, in the polyester film of the present invention, as described above, it is desirable that particles having an average particle diameter which is out of the above specific average particle ranges be contained not at all or contained as little as possible. Although particles having broad particle size distribution cannot be determined from the average particle diameter thereof, particles having particle diameters which rather deviate from the average particle diameter are actually also contained, disadvantageously.

The above particles are added to a reaction system, preferably as slurry of glycol, generally at the time of reaction for forming the polyester, e.g., at any time during an ester interchange reaction or a polycondensation reaction when an ester interchange method is used or at any time when a direct polymerization method is used. The particles are preferably added to the reaction system as a slurry of glycol, particularly during the initial stage of the polycondensation reaction, e.g., before the intrinsic viscosity reaches about 0.3.

The polyester film in the present invention preferably has 0 to 10, more preferably 0 to 7, particularly preferably 0 to 5 coarse projections having a height of 0.58 μm or higher per 10 cm$^2$ of the surface of the film. Thereby, adhesion to, for example, an adhesive layer which may be laminated on the film can be improved, and set-off to a processing layer can be prevented, for example.

In addition to the above fine particles, the polyester film in the present invention can contain a coloring agent, a known antistatic agent, an organic lubricant, a catalyst, a stabilizer, an antioxidant, an ultraviolet absorber, a fluorescent brightening agent, and other resins such as a polyethylene, a polypropylene, an ethylene-propylene copolymer and an olefinic ionomer as required.

The polyester film in the present invention may be a single-layer film or a laminated film.

Preferred as a laminated polyester film in the present invention is a laminated film formed by stretching an unstretched film obtained by a coextrusion method comprising melt-coextruding all film layers from a die of an extruder and then heat-treating the stretched film. The laminated polyester film may be a laminated film comprising two layers or a multilayer film comprising three or more layers.

It is to be understood that when the above laminated polyester film contains the first particles and the second particles, it contains the particles in a layer which forms at least one outermost layer.

When the outermost layer containing these particles is referred to as "layer A", the layer A is formed on at least one side of the laminated film. However, it may be formed on both sides of the film. When the particles are contained in the outermost layers on both sides of the laminated film, the types and contents of the particles may be the same or different. Therefore, the laminated polyester film may be, for example, a laminated film having an A/B-type two-layer structure or A/B/A-type three-layer structure using two polymers, a laminated film having a three-layer structure using three polymers such as an A/B/A' type or a laminated film comprising four or more layers using two or more polymers such as an A/B/C/B/A type or an A/B/A/B/A type. Polyesters constituting inner layers such as the layer B and the layer C may be the same as or different from a polyester constituting the layer A but is preferably the same as the polyester constituting the layer A. Further, the polyester films constituting the inner layers may or may not contain the particles. However, when the polyester films contain the particles, the content of the particles in the polyester films is preferably lower than the content of the particles in the layer A. Further, the inner layers may be formed from melts of recovered polyester films.

The thickness of the polyester film in the present invention is preferably 20 to 500 μm, more preferably 50 to 450 μm, particularly preferably 75 to 300 μm, regardless of whether it is a single-layer film or a laminated film. When the thickness is smaller than 20 μm, the film has poor elasticity, while when the thickness is too large, e.g., larger than 500 μm, film formability is liable to be poor disadvantageously. As a film to be laminated on a liquid crystal polarizing plate, the thickness of the film is preferably 10 to 100 μm, more preferably 10 to 75 μm, particularly preferably 10 to 50 μm. When the thickness is smaller than 10 μm, the film has poor elasticity, while when the thickness is too large, e.g., larger than 100 μm, film formability is poor and the elasticity of the film is so high that it may damage a polarizing plate when removed disadvantageously.

Antistatic Coating Film

The antistatic film of the present invention has an antistatic coating film on at least one surface of the polyester film. This coating film is formed by applying a coating solution containing an antistatic agent on the polyester film, stretching the coated film and drying the film before, after or during stretching.

An antistatic agent (hereinafter may be referred to as "antistatic agent (A)") used in the present invention is a polymer having a polymerized unit (A1) represented by the following formula (1):

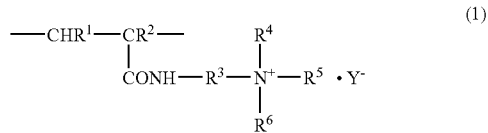
(1)

wherein $R^1$ and $R^2$ each independently represent a hydrogen atom or a methyl group, $R^3$ represents an alkylene group having 2 to 10 carbon atoms, $R^4$ and $R^5$ each independently represent an alkyl group having 1 to 5 carbon atoms, $R^6$ represents a hydrogen atom, an alkyl group having 1 to 5 carbon atoms or a hydroxyalkyl group having 2 to 10 carbon atoms, and $Y^-$ represents a halogen ion, a halogenated alkyl ion, a nitrate ion, a sulfate ion, an alkyl sulfate ion, a sulfonate ion or an alkyl sulfonate ion.

$Y^-$ in the above formula (1) is preferably an alkyl sulfonate ion represented by $R^9SO_3^-$, (wherein $R^9$ is a saturated hydrocarbon group having 1 to 5 carbon atoms) and is particularly preferably $CH_3SO_3^-$, $C_2H_5SO_3^-$ or $C_3H_7SO_3^-$. Further, a polymer having a polymerized unit (A1) represented by the formula (1) wherein $R^3$ is a propylene group and $R^6$ is H is preferred because it provides the coating film with good adhesion to the polyester film, good heat resistance, and an excellent antistatic property in particular.

Preferably, the above polymer can further contain a polymerized unit (A2) derived from a reactive acrylic monomer in addition to the polymerized unit represented by the above formula (1).

The reactive acrylic monomer refers to an acrylic monomer capable of reaction such as self-crosslinking by heat and is preferably N-methoxymethyl acrylamide, 2-hydroxyethyl acrylate, 2-hydroxyethyl methacrylate, N-methylol methacrylamide or the like.

The ratio between the polymerized unit (A1) and the polymerized unit (A2) derived from the reactive acrylic monomer is preferably (A1)=50 to 95 mol % and (A2)=50 to 5 mol %, more preferably (A1)=70 to 95 mol % and (A2)=30 to 5 mol %. In this case, the coating film has good adhesion to the polyester, good heat resistance and good abrasion resistance, and an excellent antistatic property in particular.

The polymerized units (A1) and (A2) constitute, for example, 70 to 100 mol %, preferably 80 to 100 mol % of all recurring units.

The above polymer comprising the polymerized units (A1) and (A2) can be preferably produced by the following method, for example. That is, to a 1-liter four-neck flask equipped with a thermometer, an agitator, a dropping funnel and a Dean Stark diversion device, 400 ml of xylene, 150 g of acrylic acid/N-methylol acrylamide (acrylic acid/N-methylol acrylamide=50/50) and 1.0 g of paratoluenesulfonic acid are added.

Then, 21.1 g of N,N-dimethylaminopropylamine is added thereto, the resulting mixture is heated to 140° C. by use of an oil bath, produced water is continuously removed by azeotropy with xylene, the mixture is allowed to further react at 140° C. for 17 hours, and the amidation reaction is continued until no more water is produced and azeotropy of water is no longer observed.

458 g of the obtained reaction product is cooled to 80° C., and 31.1 g of dimethyl sulfate is gradually dropped to the reaction mixture through the dropping funnel over 1 hour. During this period, generation of heat is observed, but the reaction temperature is kept at 90° C. by cooling. After completion of dropping, an aging reaction is carried out at 100° C. for 4 hours. The thus obtained reaction product is charged into a large amount of methanol, and the produced precipitate is collected and dried so as to obtain a polymer antistatic agent.

Further, the polymer used in the present invention can preferably further contain a polymerized unit (A3) represented by the following formula (2):

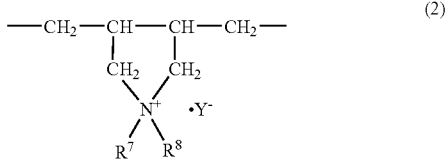

wherein $R^7$ and $R^8$ each independently represent a hydrogen atom or an alkyl group having 1 to 5 carbon atoms, and $Y^-$ is the same as defined with respect to the above formula (1), in addition to the polymerized unit (A1) represented by the above formula (1).

The ratio between the polymerized unit (A1) and the polymerized unit (A3) is preferably the polymerized unit (A1)=50 to 90 mol % and the polymerized unit (A3)=50 to 10 mol %, more preferably the polymerized unit (A1)=70 to 90 mol % and the polymerized unit (A3)=30 to 10 mol %. In this case, the coating film has good adhesion to the polyester and good heat resistance, and an excellent antistatic property in particular.

The above polymer comprising the polymerized units (A1) and (A3) can be preferably produced by the following method, for example. That is, it can be produced by subjecting an acrylic ester monomer and diallylmethylamine to emulsion polymerization so as to form a polyacrylate-pyrrolidium copolymer having a weight average molecular weight of 2,000 to 100,000, then reacting the copolymer with N,N-dialkylaminoalkylamine such as N,N-dimethylaminopropylamine or N,N-diethylaminopropylamine so as to amidate it, and finally carrying out a quaternary hydroxyalkylation reaction thereby introducing a quaternary cation pair.

The average molecular weight (number average molecular weight) of the above polymer as the antistatic agent (A) is preferably 3,000 to 300,000, more preferably 5,000 to 100,000. When the average molecular weight is lower than 3,000, the back transferability of the antistatic agent is liable to deteriorate, while when the average molecular weight is higher than 300,000, the viscosity of the aqueous coating solution becomes so high that the coating solution is difficult to apply to the film uniformly disadvantageously.

Binder Resin

In addition to the above antistatic agent (A), the antistatic coating film in the present invention preferably contains a binder resin (B) so as to further improve adhesion to the polyester film. Illustrative examples of the binder resin include a polyester resin (B-1) such as a copolyester and an acrylic resin (B-2) such as an acrylic copolymer. These resins can be used alone or in combination of two or more. Use of the acrylic resin (B-2), especially an acrylic resin having a glass transition temperature of –10 to 50° C., is preferred because adhesion between the antistatic coating film and the polyester film becomes particularly good.

The polyester resin (B-1) is preferably a copolyester resin.

Illustrative examples of an acid component constituting the copolyester resin include terephthalic acid, isophthalic acid, phthalic acid, 2,6-naphthalene dicarboxylic acid, 1,4-cyclohexane dicarboxylic acid, adipic acid, sebacic acid, phenylindane dicarboxylic acid, and dimer acid. These components can be used alone or in combination of two or more. Together with these components, unsaturated polybasic acids such as maleic acid, fumaric acid and itaconic acid and hydroxycarboxylic acids such as p-hydroxybenzoic acid and p-(β-hydroxyethoxy)benzoic acid can be used in a small amount. The amount of the unsaturated polybasic acid component or hydroxycarboxylic acid component is preferably as high as 10 mol %, more preferably not larger than 5 mol %. Meanwhile, illustrative examples of a diol component include ethylene glycol, 1,4-butanediol, neopentyl glycol, diethylene glycol, dipropylene glycol, 1,6-hexanediol, 1,4-cyclohexane dimethanol, xylylene glycol, dimethylol propionic acid, glycerine, trimethylolpropane, poly(ethyleneoxy)glycol, and poly(tetramethyleneoxy)glycol. These can be used alone or in combination of two or more.

Of these diol components, ethylene glycol, 1,4-butanediol and neopentyl glycol are preferred, and ethylene glycol is particularly preferred.

The above copolyester resin can be copolymerized with a slight amount of a sulfonate-group-containing compound or carboxylate-group-containing compound so as to facilitate preparation of an aqueous liquid, i.e., an aqueous solution or an aqueous dispersion. The copolymerization is preferred.

Preferred examples of the sulfonate-group-containing compound include alkali metal sulfonate based or amine sulfonate based compounds such as 5-sodium sulfoisophthalate, 5-ammonium sulfoisophthalate, 4-sodium sulfoisophthalate, 4-methyl ammonium sulfoisophthalate, 2-sodium sulfoisophthalate, 5-potassium sulfoisophthalate, 4-potassium sulfoisophthalate, 2-potassium sulfoisophthalate, and sodium sulfosuccinate. Illustrative examples of the carboxylate-group-containing compound include trimellitic anhydride, trimellitic acid, pyromellitic anhydride, pyromellitic acid, trimesic acid, cyclobutanetetracarboxylic acid, dimethylol propionic acid, and monoalkali metal salts thereof. A free carboxyl group is formed into a carboxylate group by the action of an alkali metal compound or an amine compound after copolymerization.

The above copolyester resin (B-1) can also be used as a modified block polymer or modified graft polymer obtained by modifying the above copolyester with an acrylic resin, polyurethane resin, silicone resin, epoxy resin, phenol resin or the like.

The copolyester resin can be produced by a conventionally known or used polyester producing technique. For example, it can be produced by a method comprising subjecting 2,6-naphthalene dicarboxylic acid or an ester forming derivative thereof such as dimethyl ester, isophthalic acid or an ester forming derivative thereof such as dimethyl ester and trimellitic anhydride to a neopentyl glycol reaction with ethylene glycol so as to form a monomer or oligomer, subjecting the monomer or oligomer to a polycondensation reaction under vacuum so as to form a copolyester having a given intrinsic viscosity (intrinsic viscosity measured at 35° C. by use of o-chlorophenol of 0.2 to 0.8 is preferred), and reacting a free carboxyl group with an alkali compound or amine compound so as to form a salt. In that case, catalysts for accelerating the reactions, e.g., an esterification or transesterification catalyst and a polycondensation catalyst, are preferably used, and it is also possible to add various additives such as a stabilizer.

The above acrylic resin (B-2) is preferably an acrylic copolymer, for example. Illustrative examples of components constituting the acrylic copolymer include acrylic acid, methyl acrylate, ethyl acrylate, butyl acrylate, sodium acrylate, ammonium acrylate, 2-hydroxyethyl acrylate, methacrylic acid, methyl methacrylate, ethyl methacrylate, butyl methacrylate, sodium methacrylate, ammonium methacrylate, 2-hydroxyethyl methacrylate, glycidyl methacrylate, acryl methacrylate, sodium vinyl sulfonate, sodium methallyl sulfonate, sodium styrene sulfonate, acrylamide, methacrylamide, and N-methylol methacrylamide. These monomers can be used in combination with other unsaturated monomers such as styrene, vinyl acetate, acrylonitrile, methacrylonitrile, vinyl chloride, vinylidene chloride and divinylbenzene.

Further, the above acrylic copolymer can also be used as a modified block polymer or modified graft polymer obtained by modifying the above acrylic copolymer with a polyester resin, polyurethane resin, silicone resin, epoxy resin, phenol resin or the like.

Further, binder resins other than those described above can also be added to the antistatic coating film in the present invention so as to adjust adhesion between the coating film and the polyester film. Illustrative examples of the resins include a polyurethane resin, an epoxy resin, a vinyl resin, a polyether resin and a water soluble resin.

The binder resin (B) is particularly preferably an acrylic resin having a glass transition temperature of −10 to 50° C. The acrylic resin provides the antistatic coating film with excellent adhesion to the base film and an excellent anti-blocking property, heat resistance and antistatic property at low humidity.

Surfactant

The antistatic coating film in the present invention preferably contains a surfactant so as to have high adhesion to the polyester film and a good anti-blocking property of an antistatic laminated film. Illustrative examples of the surfactant include nonionic surfactants such as an alkylene oxide homopolymer, an alkylene oxide copolymer, an aliphatic alcohol•alkylene oxide adduct, a long-chain aliphatic substituted phenol•alkylene oxide addition polymer, a polyhydric alcohol aliphatic ester and a long-chain aliphatic amide alcohol, and cationic or anionic surfactants such as a compound containing a quaternary ammonium salt, a compound containing an alkylpyridinium salt and a compound containing a sulfonate. The nonionic surfactant is particularly preferred because it has an excellent effect on adhesion between the coating film and the base film and the anti-blocking property of the antistatic polyester film.

Polymer Having Oxazoline Group

The antistatic coating film preferably contains a polymer having an oxazoline group. The polymer having an oxazoline group is preferably water soluble, has a glass transition temperature of 50 to 120° C. and has an oxazoline equivalent of 80 to 250 g/equivalent. In particular, the polymer is more preferably a polymer comprising methyl methacrylate or methacrylamide as a copolymerization component.

The polymer containing an oxazoline group can be produced by polymerizing, for example, an addition-polymerizable oxazoline-group-containing monomer alone or together with other monomer.

Illustrative examples of the addition-polymerizable oxazoline-group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These may be used alone or in admixture of two or more. Of these, 2-isopropenyl-2-oxazoline is industrially easy to obtain and suitable.

The other monomer may be any monomer which can be copolymerized with the addition-polymerizable oxazoline-group-containing monomer. Illustrative examples thereof include (meth)acrylates such as an alkyl acrylate and alkyl methacrylate (wherein the alkyl group is a methyl group, ethyl group, n-propyl group, isopropyl group, n-butyl group, isobutyl group, t-butyl group, 2-ethylhexyl group or cyclohexyl group); unsaturated carboxylic acids such as acrylic acid, methacrylic acid, itaconic acid, maleic acid, fumaric acid, crotonic acid, styrene sulfonic acid and salts thereof (such as a sodium salt, potassium salt, ammonium salt and tertiary amine salt); unsaturated nitriles such as acrylonitrile and methacrylonitrile; unsaturated amides such as acrylamide, methacrylamide, N-alkyl acrylamide, N-alkyl methacrylamide, N,N-dialkyl acrylamide and N,N-dialkyl methacrylate (wherein the alkyl group is a methyl group, ethyl group, n-propyl group, isopropyl group, n-butyl group, isobutyl group, t-butyl group, 2-ethylhexyl group or cyclohexyl group); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methylstyrene. These monomers may be used alone or in combination of two or more.

As melamine, compounds obtained by reacting a methylol melamine derivative obtained by condensing melamine and formaldehyde with a lower alcohol such as methyl alcohol, ethyl alcohol or isopropyl alcohol for etherification and mixtures thereof are preferred. Illustrative examples of the methylol melamine derivative include monomethylol melamine, dimethylol melamine, trimethylol melamine, tetramethylol melamine, pentamethylol melamine and hexamethylol melamine.

Composition Ratio of Coating Film

The coating solution used for forming the antistatic coating film in the present invention preferably comprises an aqueous coating solution of solid composition that comprises 10 to 90 wt % of the antistatic agent (A) and 10 to 90 wt % of the binder resin (B) based on 100 wt % of the solid composition of the coating solution.

More preferably, the coating solution comprises an aqueous coating solution of solid composition that comprises 15 to 85 wt % of the antistatic agent (A), 10 to 85 wt % of the binder resin (B) and 1 to 15 wt % of surfactant based on 100 wt % of the solid composition of the coating solution.

When the amount of the antistatic agent (A) is 15 to 85 wt %, good adhesion between the coating film and the polyester film and a good antistatic property are attained. When the amount of the binder resin (B) is 10 to 85 wt %, a good antistatic property and good adhesion between the coating film and the polyester film are attained. When the amount of the surfactant is 1 to 15 wt %, good adhesion between the coating film and the polyester film and good anti-blocking property of the antistatic film are attained. Thus, these amounts are preferred.

Further, the coating solution particularly preferably comprises an aqueous coating solution of solid composition that comprises 20 to 80 wt % of the antistatic agent (A), 15 to 70 wt % of the binder resin (B), 1 to 15 wt % of surfactant and 3 to 25 wt % of the polymer having an oxazoline group based on 100 wt % of the solid composition of the coating solution.

The amount of the polymer (D) having an oxazoline group is preferably 3 to 25 wt % because the coating film shows good solvent resistance and good durability.

Aqueous Coating Solution

The coating film in the present invention is formed by applying an aqueous coating solution which comprises a composition comprising the above components to at least one surface of the polyester film and stretching the coated film. The coating film formed from the aqueous coating solution is dried before and/or after and/or during stretching. The coating solution to be used is an aqueous coating solution having the composition comprising the above components dissolved and/or dispersed in water which is a medium. The aqueous coating solution may contain a slight amount of an organic solvent to aid the stability of the coating solution. Illustrative examples of the organic solvent include methyl ethyl ketone, acetone, ethyl acetate, tetrahydrofuran, dioxane, cyclohexanone, n-hexane, toluene, xylene, methanol, ethanol, n-propanol, and isopropanol. One or more organic solvents may be contained.

In the present invention, the coating film is preferably formed by use of the aqueous coating solution having the above composition. To the aqueous coating solution, a lubricant is preferably added in such an amount that does not impair properties such as an adhesive property, for the purposes of providing good slipperiness to the surface of the coating film and a good anti-blocking property to the film.

Preferred examples of the lubricant include fine particles of a polystyrene resin, acrylic resin, melamine resin, silicone resin, fluorocarbon resin, urea resin, benzoguanamine resin, polyamide resin or polyester resin. The fine particles of these resins may be thermoplastic or thermosetting as long as contained in the coating film in the form of fine particles. The average particle diameter of the fine particles is preferably 20 to 80 nm, and the content of the fine particles is preferably 5 to 20 wt %.

In the present invention, additives such as an ultraviolet absorber, pigment, dye, lubricant, blocking inhibitor, water-soluble polymeric resin, crosslinking agent, e.g., oxazoline, melamine, epoxy or aziridine, and other antistatic agents can be contained in the aqueous coating solution in such an amount that does not impair the object of the present invention.

The proportion of solid in the aqueous coating solution in the present invention is preferably not higher than 30 wt %, more preferably 0.5 to 30 wt %. When the proportion is lower than 0.5 wt %, coatability to the polyester film is liable to be poor, while when the proportion is higher than 30 wt %, the appearance of the coating film is liable to deteriorate disadvantageously.

Formation of Coating Film

In the present invention, an aqueous coating solution of the above solid composition is applied to at least one surface of a polyester film. The film is preferably a polyester film before completion of crystalline orientation. Illustrative examples of the polyester film before completion of crystalline orientation include an unstretched film prepared by melting a polyester by heating and forming the polyester into a film, a monoaxially stretched film prepared by stretching the unstretched film in either the longitudinal direction or the transverse direction, and a biaxially stretched film which is prepared by stretching the unstretched film in both the longitudinal direction and the transverse direction at low stretch ratios and can be further stretched (biaxially stretched film before the film is eventually re-stretched in the longitudinal and transverse directions to complete crystalline orientation).

As a method for applying the aqueous coating solution to the polyester film, any known coating can be employed. For example, a roll coating method, a gravure coating method, a microgravure coating method, a reverse coating method, a roll brushing method, a spray coating method, an air knife coating method, an impregnation method and a curtain coating method can be used alone or in combination.

The coating solution is preferably applied in an amount of 0.5 to 50 g, more preferably 2 to 30 g, per $m^2$ of running film. The thickness of the coating film after final drying is preferably 0.01 to 1 μm, more preferably 0.02 to 0.8 μm. When the thickness of the coating film is smaller than 0.01 μm, the antistatic property becomes unsatisfactory, while when it is larger than 1 μm, the anti-blocking property deteriorates disadvantageously. The coating solution may be applied to either only one surface or both surfaces according to applications of the film. A uniform coating film is obtained by drying the coating solution after application of the solution.

In the present invention, after the polyester film is coated with the aqueous coating solution, it is dried and preferably subjected to a stretch treatment. The drying is preferably carried out at 90 to 130° C. for 2 to 20 seconds. The drying may also serve as a preheating treatment for the stretching treatment or a heat treatment at the time of stretching. The polyester film is preferably stretched to 2.5 to 7 times in the longitudinal direction and to 2.5 to 7 times in the transverse direction, i.e., to 8 times or more in terms of area ratio, more preferably 9 to 28 times in terms of area ratio, at a temperature of 70 to 140° C. When the film is to be re-stretched, it is preferably stretched at a ratio of 1.05 to 3 times (the area ratio is the same as above). The heat setting treatment after stretching is preferably carried out at temperatures higher than the final stretch temperature and not higher than the melting point for 1 to 30 seconds. For example, a polyethylene terephthalate film is preferably heat-set at 170 to 240° C. for 2 to 30 seconds.

The antistatic film of the present invention has a visible light transmittance of 70% or higher and a haze of preferably 8% or lower, more preferably 5% or lower, particularly preferably 4% or lower, for the sake of good examination of foreign materials in the film. When the haze is higher than 8%, it is difficult to determine the contents, i.e., it is difficult to determine foreign materials in the film disadvantageously.

The number F of coarse foreign materials of at least 20 μm in size in the antistatic laminated polyester film of the present invention preferably satisfies $0 \leq F \leq 10$, more preferably $0 \leq F \leq 5$, particularly preferably $0 \leq F \leq 3$ (number of foreign materials per $m^2$). When the number of the coarse foreign materials is larger than 10 per $m^2$, defects in products may be overlooked or misdetected during defect examination after processing, that is, product inspection may become difficult to carry out with good accuracy disadvantageously.

To reduce the above number of coarse foreign materials to 10 or less per $m^2$, a nonwoven type filter made of stainless steel thin wires having a wire diameter of not larger than 15 μm and having an average opening size of 5 to 25 μm, preferably 10 to 20 μm, is preferably used, as a filter at the time of producing the laminated polyester film, to filter out the foreign materials. The effect of filtering out the foreign materials is more remarkable when two filters of the above type are used. When the opening size of the filter to be used is smaller than 5 μm, pressure and an increase in pressure at the time of filtration are high, so that it is difficult to be practically used as a filter from an industrial standpoint. Further, when the wire diameter is larger than 15 μm, coarse particles cannot be collected with an average opening size of 5 to 25 μm.

Further, when the antistatic film of the present invention is used in applications requiring concealment, an antistatic film using a polyester film which contains 5 to 25 wt % of white pigment and has a thickness of 20 to 300 μm to attain a sufficient degree of concealment is preferred.

On the antistatic film of the present invention, an adhesive layer may be formed on one surface thereof, and a protective layer may be formed on the other surface thereof.

That is, according to the present invention, a film to be laminated on a liquid crystal polarizing plate, the film comprising the antistatic film of the present invention, an adhesive layer on one surface of the antistatic film, and a temporarily existing layer on the surface of the adhesive layer, is also provided.

The above temporarily existing layer may be, for example, a protective film which is removed to laminate the film on a liquid crystal polarizing plate or a removable film which is removed after laminated on a liquid crystal polarizing plate.

Further, according to the present invention, a film for a label, the film comprising the antistatic film of the present invention and an ultraviolet curing ink layer or a thermosetting ink layer on the surface of the antistatic coating film of the antistatic film, and a film for a magnetic card, the film comprising the antistatic film of the present invention, a magnetic layer on the surface of the antistatic coating film of the antistatic film, and an ultraviolet curing ink layer on the other surface of the antistatic film, are also provided.

EXAMPLES

Hereinafter, the present invention will be further described with reference to Examples.

Further, evaluations in the present invention were made in accordance with the following methods.

A polyethylene terephthalate and a polyethylene naphthalate may be abbreviated as "PET" and "PEN", respectively.

1. Surface Resistivity (Antistatic Property)

The surface resistivity ($\Omega/\square$) of a sample film after a voltage of 500 V is applied for 1 minute is measured by use of a resistivity measuring device of Takeda Riken Co., Ltd. at a measurement temperature of 23° C. and a measurement humidity of 60%. The surface resistivity is preferably $3\times10^{12}$ [$\Omega/\square$] or less, more preferably $3\times10^{11}$ [$\Omega/\square$] or less.

2. Anti-blocking Property

The surface where a laminated coating film is formed and surface where no laminated coating film is formed of a sample film cut to a width of 50 mm were stuck together and treated under a load of 50 kg/cm$^2$ at 60° C. and 80% RH for 17 hours. Then, peel strength between the coated surface and the uncoated surface is measured, and an anti-blocking property is evaluated based on the following criteria.

Rank A: Peel Strength≦10 g (good anti-blocking property)
Rank B: 10 g<Peel Strength≦30 g (rather poor anti-blocking property)
Rank C: 30 g<Peel Strength (poor anti-blocking property)

3. Back Transferability

The coated surface and uncoated surface of a sample film are stuck together and treated under a load of 6 kg/cm$^2$ at 50° C. and 70% RH for 17 hours. Then, the water contact angle (θ: alternative characteristic of back transferability) of the uncoated surface is measured and evaluated based on the following criteria.

Rank A: θ≧55° C. (good back transferability)
Rank B: 55° C.>θ≧48° C. (rather good back transferability)
Rank C: 48° C.>θ (poor back transferability)

The water contact angle is measured by setting the above sample film on a contact angle measuring device (product of Elmer Co., Ltd.) with the uncoated surface facing upward, dropping a drop of water at a temperature of 23° C., and reading the contact angle of the drop of water after 1 minute from the dropping. The water contact angle of a film without back transferability is 60 to 72° C., the water contact angle of a film with good back transferability is 55° C. or larger, and the water contact angle of a film with poor back transferability is smaller than 48° C.

4. Abrasion Resistance

A film sample cut to a width of 20 mm is made contact with a cylindrical stainless stationary bar having a diameter of 10 mm on the coating film side of the film and caused to run 80 meters under a load of 200 g. Then, bloom of the coating film adhered on the bar is observed, and abrasion resistance is evaluated based on the following criteria.

Rank A: No bloom is adhered on the bar. (good abrasion resistance)
Rank B: Bloom is adhered on the bar in small quantity. (rather poor abrasion resistance)
Rank C: Bloom is adhered on the bar in large quantity. (poor abrasion resistance)

5. Degree of Coloration of Reproduced Film (Recoverability)

A film having no coating film is crushed, molten in an extruder at about 300° C. and formed into a chip. Then, the obtained chip is molten to prepare a blank film. The degree of coloration of the film is defined as "blank". Meanwhile, a sample film having a laminated coating film is crushed, molten in an extruder at about 300° C. and formed into a chip. Then, the obtained chip is molten to prepare a reproduced film. The degree of coloration of this film is evaluated based on the following criteria.

Rank A: The degree of coloration of the film is comparable to that of blank film.
Rank B: The film is somewhat colored.
Rank C: The degree of coloration of the film is so high that the film lacks practicality.

6. Adhesion of UV Ink

After ultraviolet curing print ink (Flush Dry FDO RED APN of Toyo Ink Mfg. Co., Ltd.) is printed on the surface where a coating film is formed of a sample film by use of an RI tester (product of MEI SEISAKUJO CO., LTD.), the printed ink is cured by means of a medium-pressure mercury lamp (80 W/cm, one lamp type; product of Japan Storage Battery Co., Ltd.) UV curing device to form an UV ink layer having a thickness of 3.0 μm. On this UV ink layer, a scotch tape (18 mm in width; product of Nichiban Co., Ltd.) having a length of 15 cm is stuck. A given load is applied on the tape by a 2-kg manual load roll to fix the tape, and then one end of the scotch tape is peeled in the 90° C. direction to evaluate peel adhesion. The adhesion is evaluated based on the following criteria.

Rank A: The ink layer is not peeled at all. (good ink adhesion)
Rank B: The ink layer is partially peeled from the coating film in the form of cohesive failure. (rather good ink adhesion)
Rank C: The ink layer is peeled from the coating film in the form of a layer. (poor ink adhesion)

7. Oxazoline Equivalent

A solution of a polymer containing oxazoline is freeze-dried and analyzed by $^1$H-MNR. An oxazoline equivalent is calculated from an absorption peak intensity derived from an oxazoline group and absorption peak intensities derived from other monomers.

8. Secondary Transition Point

This is measured at a temperature increasing rate of 20° C./min by use of Thermal Analyst 2000 type differential calorimeter of Du Pont Co., Ltd.

9. Haze and Coarse Foreign Materials

The haze value of a film is measured by use of NDH2000 integrating sphere type haze meter of Nippon Denshoku Industries Co., Ltd. in accordance with JIS K-7136.

10. Number of Coarse Foreign Materials

The size and number of foreign materials in a film are determined by magnifying the film by 20 times by transmission irradiation by use of an universal projector and counting the number of foreign materials having a maximum length of 20 μm or larger as coarse foreign materials. The measurement area is 1 m².

11. Number of Coarse Projections

Two films each having a size of 10 cm×10 cm are stuck together and irradiated with sodium D radiation (wavelength: 0.57 nm) from underneath, and the height of projections is determined from the number of interference rings observed. The interference rings each represent a projection height of 0.29 μm, and the number of projections having two or more interference rings per unit area is calculated and taken as the number of coarse projections.

12. Average Particle Diameter of Particles

Particles are scattered such that they do not overlap as much as possible. A metal deposition film having a thickness of 200 to 300 angstroms is formed thereon by a metal sputtering device. The particles are observed at 10,000 to 30,000 times by a scanning electron microscope. Image processing is conducted by Ruzex 500 of NIRECO CORPORATION, and the average particle diameter is determined from 100 particles.

13. Windability (Slipperiness)

Windability (slipperiness) is evaluated based on the following three levels through a winding step including slit at the time of film production.

A: No wrinkles are formed in the film.
B: Wrinkles are sometimes formed in the film.
C: Wrinkles are always formed in a portion of or all over the film.

14. Air Release Index 20 film pieces each cut to a size of 8 cm×5 cm are laminated. At the center of the film pieces excluding the top film piece, an equilateral triangular hole having a side of 2 mm is formed, and an air release index (mmHg/hr) per unit time is measured by use of DIGITALBEC smoothness tester (product of Toyo Seiki Seisaku-Sho, Ltd.)

Production of Polymer Antistatic Agent:

To a 1-liter four-neck flask equipped with a thermometer, an agitator, a dropping funnel and a Dean Stark diversion device, 400 ml of xylene, 150 g of acrylic acid/N-methylol acrylamide (acrylic acid/N-methylol acrylamide=50/50) and 1.0 g of paratoluenesulfonic acid were added.

Then, 21.1 g of N,N-dimethylaminopropylamine was added thereto, the resulting mixture was heated to 140° C. by use of an oil bath, produced water was continuously removed by azeotropy with xylene, the mixture was allowed to further react at 140° C. for 17 hours, and the amidation reaction was continued until no more water was produced and azeotropy of water was no longer observed.

458 g of the obtained reaction product was cooled to 80° C., and 31.1 g of dimethyl sulfate was gradually dropped to the reaction mixture through the dropping funnel over 1 hour. During this period, generation of heat was observed, but the reaction temperature was kept at 90° C. by cooling. After completion of dropping, an aging reaction was carried out at 100° C. for 4 hours. The thus obtained reaction product was charged into a large amount of methanol, and the produced precipitate was collected and dried to obtain an antistatic agent A-1.

Example 1

As a polymer antistatic agent (A-1), a polymer antistatic agent comprising 95 mol % of unit represented by the following formula (1-2) and 5 mol % of N-methylol acrylamide and having an average molecular weight of 10,000 was prepared.

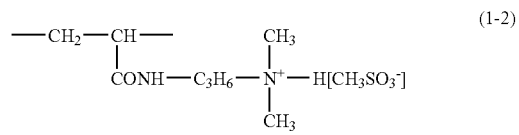

A polyethylene terephthalate (PET) having an intrinsic viscosity (o-chlorophenol, 35° C.) of 0.65 and comprising 0.01 wt % of crosslinked silicone having a particle diameter of 1.2 μm as first particles and 0.15 wt % of spherical silica having a particle diameter of 0.3 μm as second particles was molten and cast on a cooling drum, and the obtained unstretched film was stretched to 3.6 times in the longitudinal direction.

As an aqueous solution 1, a 10-wt % aqueous solution of solid composition comprising 35 wt % of copolyester (Tg=80° C., average molecular weight=21,500) (B-1) formed from terephthalic acid (22 mol %), isophthalic acid (1 mol %), 2,6-naphthalene dicarboxylic acid (65 mol %), 4,4'-diphenyl dicarboxylic acid (12 mol %), ethylene glycol (75 mol %), 1,4-cyclohexane dimethanol (10 mol %) and neopentyl glycol (15 mol %), 60 wt % of the polymer antistatic agent (A-1) and 5 wt % of polyoxyethylene lauryl ether (C-1) was prepared.

On one surface of the monoaxially stretched film, 4 g/m² (wet) of the aqueous solution 1 was coated by a microgravure coating method.

After dried, the film was stretched to 3.6 times in the transverse direction and heat-treated at 230° C. to obtain an antistatic polyester film having a thickness of 100 μm. The properties of this film are shown in Table 1.

Example 2

As an acrylic copolymer (B-2), an acrylic copolymer (number average molecular weight: 258,000, Tg=22° C.) formed from methyl methacrylate (30 mol %), ethyl acrylate (55 mol %), acrylonitrile (10 mol %) and N-methylol methacrylamide (5 mol %) was prepared.

An antistatic polyester film was obtained in the same manner as in Example 1 except that the acrylic copolymer (B-2) was used in place of the copolyester (B-1). The properties of this film are shown in Table 1.

Example 3

As an aqueous solution 2, a 10-wt % aqueous solution of solid components comprising 20 wt % of the copolyester (B-1), 25 wt % of the acrylic copolymer (B-2), 50 wt % of the polymer antistatic agent (A-1) prepared in Example 1 and 5 wt % of the polyoxyethylene lauryl ether (C-1) was prepared.

An antistatic polyester film was obtained in the same manner as in Example 1 except that the aqueous solution 2 was used in place of the aqueous solution 1. The properties of this film are shown in Table 1.

Example 4

As a polymer antistatic agent (A-2), a polymer antistatic agent comprising 80 mol % of the unit represented by the formula (1-2) and 20 mol % of N-methylol acrylamide and having an average molecular weight of 12,000 was prepared.

An antistatic polyester film was obtained in the same manner as in Example 2 except that the polymer antistatic agent (A-2) was used in place of the polymer antistatic agent (A-1). The properties of this film are shown in Table 1.

Example 5

As a polymer antistatic agent (A-3), a polymer antistatic agent represented by the formula (1-3) resulting from substituting [CH$_3$SO$_3^-$] of the polymer antistatic agent (A-1) with [C$_2$H$_5$SO$_3^-$] was prepared.

An antistatic polyester film was obtained in the same manner as in Example 2 except that the polymer antistatic agent (A-3) was used in place of the polymer antistatic agent (A-1). The properties of this film are shown in Table 1.

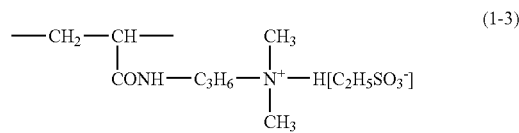

(1-3)

Example 6

As a polymer antistatic agent (A-4), a polymer antistatic agent comprising 90 mol % of unit represented by the following formula (1-4) and 10 mol % of 2-hydroxyethyl methacrylate and having an average molecular weight of 15,000 was prepared.

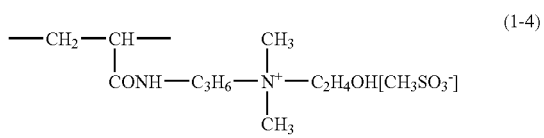

(1-4)

An antistatic polyester film was obtained in the same manner as in Example 2 except that the polymer antistatic agent (A-4) was used in place of the polymer antistatic agent (A-1). The properties of this film are shown in Table 1.

Example 7

As an aqueous solution 3, a 10-wt % aqueous solution of solid components comprising 83 wt % of the acrylic copolymer (B-2), 17 wt % of the polymer antistatic agent (A-1) prepared in Example 1 and 5 wt % of the polyoxyethylene lauryl ether (C-1) was prepared.

An antistatic polyester film was obtained in the same manner as in Example 1 except that the aqueous solution 3 was used in place of the aqueous solution 1. The properties of this film are shown in Table 1.

Example 8

As an aqueous solution 4, a 10-wt % aqueous solution of solid components comprising 12 wt % of the acrylic copolymer (B-2), 83 wt % of the polymer antistatic agent (A-1) prepared in Example 1 and 5 wt % of the polyoxyethylene lauryl ether (C-1) was prepared.

An antistatic polyester film was obtained in the same manner as in Example 1 except that the aqueous solution 4 was used in place of the aqueous solution 1. The properties of this film are shown in Table 1.

Example 9

As an aqueous solution 5, a 10-wt % aqueous solution of solid components comprising 15 wt % of the acrylic copolymer (B-2), 70 wt % of the polymer antistatic agent (A-1) prepared in Example 1, 10 wt % of polymer containing an oxazoline group (molecular weight: 100,000, Tg=100° C., oxazoline equivalent=150 g (solid)/equivalent) (D-1) comprising 2-isopropenyl-2-oxazoline (63 mol %), methyl methacrylate (14mol %) andmethacrylamide (23mol %) and 5 wt % of the polyoxyethylene lauryl ether (C-1) was prepared.

An antistatic polyester film was obtained in the same manner as in Example 1 except that the aqueous solution 5 was used in place of the aqueous solution 1. The properties of this film are shown in Table 1.

Example 10

An antistatic polyester film was obtained in the same manner as in Example 2 except that a polyethylene naphthalate film was used in place of the polyethylene terephthalate film. The properties of this film are shown in Table 1.

Example 11

A composition comprising 90 wt % of polyethylene terephthalate having an intrinsic viscosity (o-chlorophenol, 35° C.) of 0.65 and 10 wt % of titanium oxide having an average particle diameter of 0.4 μm was molten and cast on a cooling drum, and the obtained unstretched film was stretched to 3.6 times in the longitudinal direction.

As an aqueous solution 7, a 10-wt % aqueous solution of solid composition comprising 35 wt % of the acrylic copolymer (B-2), 60 wt % of the polymer antistatic agent (A-1) prepared in Example 1 and 5 wt % of the polyoxyethylene lauryl ether (C-1) was prepared.

On one surface of the monoaxially stretched film, 4 g/m$^2$ (wet) of the aqueous solution 7 was coated by a microgravure coating method.

After dried, the film was stretched to 3.6 times in the transverse direction and heat-treated at 230° C. to obtain an antistatic polyester film having a thickness of 188 μm. The properties of this film are shown in Table 1.

Example 12

An antistatic polyester film was obtained in the same manner as in Example 1 except that 0.03 wt % of first particles having a particle diameter of 1.2 μm and 0.24 wt % of second particles having a particle diameter of 0.12 μm were used. The properties of this film are shown in Table 1.

Example 13

An antistatic polyester film was obtained in the same manner as in Example 1 except that a polymer antistatic agent comprising 95 mol % of the unit represented by the above formula (1-2) and 5 mol % of N-methoxymethyl acrylamide and having an average molecular weight of 10,000 was used as the polymer antistatic agent (A-1). The properties of this film are shown in Table 1.

Comparative Example 1

As an aqueous solution 8, a 10-wt % aqueous solution of solid composition comprising 88 wt % of the copolyester (B-1), 7 wt % of the polymer antistatic agent (A-1) and 5 wt % of polyoxyethylene nonylphenyl ether (C-2) was prepared.

An antistatic polyester film was obtained in the same manner as in Example 1 except that the aqueous solution 8 was used in place of the aqueous solution 1. The properties of this film are shown in Table 1.

Comparative Example 2

As an aqueous solution 9, a 10-wt % aqueous solution of solid composition comprising 95 wt % of the polymer antistatic agent (A-1) and 5 wt % of the polyoxyethylene nonylphenyl ether (C-2) was prepared.

An antistatic polyester film was obtained in the same manner as in Example 1 except that the aqueous solution 9 was used in place of the aqueous solution 1. The properties of this film are shown in Table 1.

Comparative Example 3

As an aqueous solution 10, a 10-wt % aqueous solution of solid composition comprising 70 wt % of the copolyester (B-1), 25 wt % of sodium polystyrene sulfonate (A-5) as an antistatic agent and 5 wt % of the polyoxyethylene nonylphenyl ether (C-2) was prepared.

An antistatic polyester film was obtained in the same manner as in Example 1 except that the aqueous solution 10 was used in place of the aqueous solution 1. The properties of this film are shown in Table 1.

Comparative Example 4

As an aqueous solution 11, a 10-wt % aqueous solution of solid composition comprising 70 wt % of the copolyester (B-1), 25 wt % of sodium dodecylbenzene sulfonate (A-6) and 5 wt % of the polyoxyethylene nonylphenyl ether (C-1) was prepared.

An antistatic polyester film was obtained in the same manner as in Example 1 except that the aqueous solution 11 was used in place of the aqueous solution 1. The properties of this film are shown in Table 1.

Comparative Example 5

A biaxially stretched polyester film was obtained in the same manner as in Example 1 except that the aqueous solution 1 was not coated. The properties of this film are shown in Table 1.

Comparative Example 6

An antistatic laminated polyester film was obtained in the same manner as in Example 1 except that the size of the openings of the filter was changed from 20 μm to 30 μm. The properties of this film are shown in Table 1.

Comparative Example 7

An antistatic laminated polyester film was obtained in the same manner as in Example 1 except that the average particle diameter and amount of the lubricant to be added to PET were changed as shown in Table 1 and that the size of the openings of the filter was changed from 20 μm to 30 μm. The properties of this film are shown in Table 1.

Comparative Example 8

An antistatic laminated polyester film was obtained in the same manner as in Example 1 except that the type, average particle diameter and amount of the lubricant to be added to PET were changed as shown in Table 1. The properties of this film are shown in Table 1.

TABLE 1

| | Thickness μm | Layer Configuration A/B/A μm | Particles Contained in Surface Layer Type of Lubricant | Particle Diameter μm | Additive Wt % | Coarse Foreign Material Number/10 cm$^2$ | Coarse Projection Number/10 cm$^2$ | Windability |
|---|---|---|---|---|---|---|---|---|
| Ex. 1 | 38 | 2/34/2 | Crosslinked Silicone | 1.2 | 0.01 | 5 | 1 | A |
| | | | Spherical Silica | 0.3 | 0.15 | | | |
| Ex. 2 | 38 | 2/34/2 | Crosslinked Silicone | 1.2 | 0.01 | 5 | 1 | A |
| | | | Spherical Silica | 0.3 | 0.15 | | | |
| Ex. 3 | 38 | 2/34/2 | Crosslinked Silicone | 1.2 | 0.01 | 5 | 1 | A |
| | | | Spherical Silica | 0.3 | 0.15 | | | |
| Ex. 4 | 38 | 2/34/2 | Crosslinked Silicone | 1.2 | 0.01 | 5 | 1 | A |
| | | | Spherical Silica | 0.3 | 0.15 | | | |
| Ex. 5 | 38 | 2/34/2 | Crosslinked Silicone | 1.2 | 0.01 | 5 | 1 | A |
| | | | Spherical Silica | 0.3 | 0.15 | | | |
| Ex. 6 | 38 | 2/34/2 | Crosslinked Silicone | 1.2 | 0.01 | 5 | 1 | A |
| | | | Spherical Silica | 0.3 | 0.15 | | | |
| Ex. 7 | 38 | 2/34/2 | Crosslinked Silicone | 1.2 | 0.01 | 5 | 1 | A |
| | | | Spherical Silica | 0.3 | 0.15 | | | |
| Ex. 8 | 38 | 2/34/2 | Crosslinked Silicone | 1.2 | 0.01 | 5 | 1 | A |
| | | | Spherical Silica | 0.3 | 0.15 | | | |
| Ex. 9 | 38 | 2/34/2 | Crosslinked Silicone | 1.2 | 0.01 | 5 | 1 | A |
| | | | Spherical Silica | 0.3 | 0.15 | | | |

TABLE 1-continued

|  | Thickness μm | Layer Configuration A/B/A μm | Particles Contained in Surface Layer Type of Lubricant | Particle Diameter μm | Additive Wt % | Coarse Foreign Material Number/10 cm² | Coarse Projection Number/10 cm² | Windability |
|---|---|---|---|---|---|---|---|---|
| Ex. 10 | 38 | 2/34/2 | Crosslinked Silicone Spherical Silica | 1.2 0.3 | 0.01 0.15 | 5 | 1 | A |
| Ex. 11 | 38 | 2/34/2 | Crosslinked Silicone Spherical Silica | 1.2 0.3 | 0.01 0.15 | 5 | 1 | A |
| Ex. 12 | 38 | 2/34/2 | Crosslinked Silicone Spherical Silica | 1.2 0.12 | 0.03 0.24 | 5 | 1 | A |
| Ex. 13 | 38 | 2/34/2 | Crosslinked Silicone Spherical Silica | 1.2 0.3 | 0.01 0.15 | 5 | 1 | A |

|  | Air Release Index mmHg/hr | Surface Resistivity Ω/□ | Anti-blocking Property | Back Transferability | Abrasion Resistance | Degree of Coloration of Reproduced Film | Adhesion of UV Ink |
|---|---|---|---|---|---|---|---|
| Ex. 1 | 16 | $6 \times 10^8$ | A | A | A | A | A |
| Ex. 2 | 16 | $3 \times 10^8$ | A | A | A | A | A |
| Ex. 3 | 16 | $6 \times 10^8$ | A | A | A | A | A |
| Ex. 4 | 16 | $2 \times 10^8$ | A | A | A | A | A |
| Ex. 5 | 16 | $4 \times 10^9$ | A | A | A | A | A |
| Ex. 6 | 16 | $2 \times 10^8$ | A | A | A | A | A |
| Ex. 7 | 16 | $1 \times 10^{10}$ | A | A | A | A | A |
| Ex. 8 | 16 | $7 \times 10^7$ | B | A | A | B | A |
| Ex. 9 | 16 | $3 \times 10^8$ | A | A | A | A | A |
| Ex. 10 | 16 | $4 \times 10^8$ | A | A | A | A | A |
| Ex. 11 | 16 | $8 \times 10^8$ | A | A | A | A | A |
| Ex. 12 | 16 | $6 \times 10^8$ | A | A | A | A | A |
| Ex. 13 | 16 | $6 \times 10^8$ | A | A | A | A | A |

|  | Thickness μm | Layer Configuration A/B/A μm | Particles Contained in Surface Layer Type of Lubricant | Particle Diameter μm | Additive Wt % | Coarse Foreign Material Number/10 cm² | Coarse Projection Number/10 cm² | Windability |
|---|---|---|---|---|---|---|---|---|
| C. Ex. 1 | 38 | 2/34/2 | Crosslinked Silicone Spherical Silica | 1.2 0.3 | 0.01 0.15 | 5 | 1 | A |
| C. Ex. 2 | 38 | 2/34/2 | Crosslinked Silicone Spherical Silica | 1.2 0.3 | 0.01 0.15 | 5 | 1 | A |
| C. Ex. 3 | 38 | 2/34/2 | Crosslinked Silicone Spherical Silica | 1.2 0.3 | 0.01 0.15 | 5 | 1 | A |
| C. Ex. 4 | 38 | 2/34/2 | Crosslinked Silicone Spherical Silica | 1.2 0.3 | 0.01 0.15 | 5 | 1 | A |
| C. Ex. 5 | 38 | 2/34/2 | Crosslinked Silicone Spherical Silica | 1.2 0.3 | 0.01 0.15 | 5 | 1 | A |
| C. Ex. 6 | 38 | 2/34/2 | Crosslinked Silicone Spherical Silica | 1.2 0.3 | 0.01 0.15 | 22 | 6 | A |
| C. Ex. 7 | 38 | 2/34/2 | Crosslinked Silicone Spherical Silica | 1.8 0.2 | 0.006 0.4 | 14 | 3 | B |
| C. Ex. 8 | 38 | 2/34/2 | Crosslinked Silicone | 0.15 | 0.5 | 5 | 3 | C |

|  | Air Release Index mmHg/hr | Surface Resistivity Ω/□ | Anti-blocking Property | Back Transferability | Abrasion Resistance | Degree of Coloration of Reproduced Film | Adhesion of UV Ink |
|---|---|---|---|---|---|---|---|
| C. Ex. 1 | 16 | $5 \times 10^{13}$ | A | A | A | A | A |
| C. Ex. 2 | 16 | $6 \times 10^7$ | C | A | C | B | C |
| C. Ex. 3 | 16 | $6 \times 10^{10}$ | A | A | C | A | A |
| C. Ex. 4 | 16 | $5 \times 10^{10}$ | C | C | A | A | A |
| C. Ex. 5 | 16 | $8 \times 10^{15}$ | A | A | A | A | C |
| C. Ex. 6 | 16 | $6 \times 10^8$ | A | A | A | A | A |
| C. Ex. 7 | 15 | $6 \times 10^8$ | A | A | A | A | A |
| C. Ex. 8 | 5 | $6 \times 10^8$ | A | A | A | A | A |

Ex.: Example
C. Ex.: Comparative Example

As described above, the antistatic polyester film in the present invention has an excellent antistatic property under low humidity, anti-blocking property, back transferability, abrasion resistance and recoverability as compared with conventional counterparts. It is useful particularly as a reproduction film, an electronic material, an OHP film, a packing film, a label or a magnetic card (e.g., a telephone card or a prepaid card).

What is claimed is:

1. An antistatic film comprising a polyester film and an antistatic coating film on at least one surface of the polyester film, the antistatic coating film comprising a polymer having a polymerized unit represented by the following formula (1):

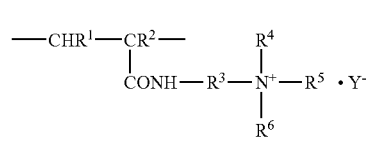

wherein $R^1$ and $R^2$ each independently represent a hydrogen atom or a methyl group, $R^3$ represents an alkylene group having 2 to 10 carbon atoms, $R^4$ and $R^5$ each independently represent an alkyl group having 1 to 5 carbon atoms, $R^6$ represents a hydrogen atom, an alkyl group having 1 to 5 carbon atoms or a hydroxyalkyl group having 2 to 10 carbon atoms, and $Y^-$ represents a halogen ion, a halogenated alkyl ion, a nitrate ion, a sulfate ion, an alkyl sulfate ion, a sulfonate ion or an alkyl sulfonate ion, wherein the polymer further comprises a polymerized unit derived from a reactive acrylic monomer in addition to the polymerized unit represented by the formula (1), wherein the antistatic coating film comprises a binder resin in addition to the polymer, the amounts of the polymer and the binder resin are 10 to 90 wt % and 10 to 90 wt %, respectively, based on their total and the binder resin is at least one selected from the group consisting of a polyester resin and an acrylic resin, and wherein the antistatic coating film further comprises 3 to 25 parts by weight of polymer having an oxazoline group based on 100 parts by weight of the total of the polymer and the binder resin.

2. The film of claim 1, wherein the antistatic coating film is formed by applying a coating solution comprising the polymer having the polymerized unit represented by the formula (1) on the polyester film and stretching the polyester film having the coating film.

3. The film of claim 1, wherein the reactive acrylic monomer is at least one selected from the group consisting of N-methoxymethyl acrylamide, 2-hydroxyethyl acrylate, 2-hydroxyethyl methacrylate and N-methylol methacrylamide.

4. The film of claim 1, wherein the molar ratio of the polymerized unit represented by the formula (1) to the polymerized unit derived from the reactive acrylic monomer is 50:50 to 95:5.

5. The film of claim 1, wherein the polymer further comprises a polymerized unit represented by the following formula (2):

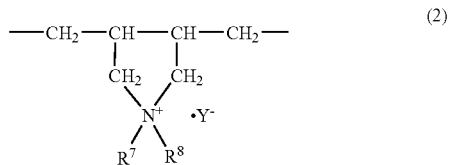

(2)

wherein $R^7$ and $R^8$ each independently represent a hydrogen atom or an alkyl group having 1 to 5 carbon atoms, and $Y^-$ is the same as defined above, in addition to the polymerized unit represented by the formula (1).

6. The film of claim 5, wherein the molar ratio of the polymerized unit represented by the formula (1) to the polymerized unit represented by the formula (2) is 50:50 to 90:10.

7. The film of claim 1, wherein the polyester film comprises 0.001 to 0.1 wt % of first particles having an average particle diameter of 0.8 to 2.5 μm and 0.1 to 0.8 wt % of second particles having an average particle diameter of 0.05 to 0.4 μm and has 0 to 5 projections each having a height of 0.58 μm or higher per 10 cm² of a surface of the film.

8. The film of claim 7, wherein the first particles and the second particles comprise different chemical species.

9. The film of claim 8, wherein one of the first particles and the second particles comprises an organic material, and the other comprises an inorganic material.

10. The film of claim 8, wherein the first particles and the second particles comprise an inorganic material.

11. The film of claim 1, wherein the antistatic coating film further comprises 1 to 15 parts by weight of surfactant based on 100 parts by weight of the total of the polymer and the binder resin.

12. The film of claim 1, wherein the polymer having an oxazoline group is water soluble, has a glass transition temperature of 50 to 120° C. and has an oxazoline equivalent of 80 to 250 g/equivalent.

13. The film of claim 1, wherein the polymer having an oxazoline group comprises a polymerized unit derived from methyl methacrylate and a polymerized unit derived from methacrylamide as copolymerized units.

14. The film of claim 1, wherein the acrylic resin as the binder resin has a glass transition temperature of −10 to 50° C.

15. The film of claim 1, wherein the polyester film is a single-layer film or a laminated film.

16. The film of claim 15, wherein the laminated film comprises three layers, and the middle layer is formed from a melt of a recovered polyester film.

17. The film of claim 1, wherein the polyester in the polyester film is a polyethylene terephthalate or polyethylene-2,6-naphthalene dicarboxylate.

18. The film of claim 1, having a visible light transmittance of 70% or higher and a haze of 8% or lower.

19. The film of claim 1, wherein the polyester film comprises 5 to 25 wt % of white pigment and has a thickness of 20 to 300 μm.

20. A film for laminating on a liquid crystal polarizing plate, the film comprising the antistatic film of claim 1, an adhesive layer on one surface of the antistatic film, and a temporarily existing layer on the surface of the adhesive layer.

21. The film of claim 20, wherein the temporarily existing layer is a protective film which is removed to laminate the film on a liquid crystal polarizing plate or a removable film which is removed after laminated on a liquid crystal polarizing plate.

22. A film for a label, the film comprising the antistatic film of claim 1 and an ultraviolet curing ink layer or a thermosetting ink layer on the surface of the antistatic coating film of the antistatic film.

23. A film for a magnetic card, the film comprising the antistatic film of claim 1, a magnetic layer on the surface of the antistatic coating film of the antistatic film, and an ultraviolet curing ink layer on the other surface of the antistatic film.

* * * * *